(12) United States Patent
von Muhlen et al.

(10) Patent No.: US 10,452,456 B2
(45) Date of Patent: Oct. 22, 2019

(54) KERNEL EVENT TRIGGERS

(71) Applicant: Dropbox, Inc., San Francisco, CA (US)

(72) Inventors: Marcio von Muhlen, San Francisco, CA (US); Vinod Valloppillil, Berkeley, CA (US); Nils Bunger, Palo Alto, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days.

(21) Appl. No.: 15/475,508

(22) Filed: Mar. 31, 2017

(65) Prior Publication Data
US 2018/0181448 A1 Jun. 28, 2018

Related U.S. Application Data

(60) Provisional application No. 62/439,373, filed on Dec. 27, 2016.

(51) Int. Cl.
| G06F 9/54 | (2006.01) |
| H04L 29/06 | (2006.01) |
| G06F 16/182 | (2019.01) |
| G06F 16/176 | (2019.01) |
| G06F 3/0482 | (2013.01) |
| G06F 17/24 | (2006.01) |
| G06F 21/62 | (2013.01) |
| G06F 21/10 | (2013.01) |
| H04L 29/08 | (2006.01) |
| G06Q 10/10 | (2012.01) |

(Continued)

(52) U.S. Cl.
CPC ............ *G06F 9/542* (2013.01); *G06F 3/0482* (2013.01); *G06F 9/545* (2013.01); *G06F 16/13* (2019.01); *G06F 16/1774* (2019.01); *G06F 16/1794* (2019.01); *G06F 16/183* (2019.01); *G06F 16/1873* (2019.01); *G06F 17/241* (2013.01); *G06F 21/10* (2013.01); *G06F 21/6218* (2013.01); *G06Q 10/10* (2013.01); *H04L 67/02* (2013.01); *H04L 67/06* (2013.01); *H04L 67/42* (2013.01); *H04L 69/30* (2013.01); *H04L 69/321* (2013.01); *G06F 2209/542* (2013.01); *G06F 2221/0704* (2013.01)

(58) Field of Classification Search
CPC .................................. G06F 9/54; G06F 9/542
See application file for complete search history.

(56) References Cited

U.S. PATENT DOCUMENTS 6,826,707 B1 * 11/2004 Stevens ............... G06F 11/0709
714/2
7,769,794 B2 8/2010 Moore et al.
(Continued)

*Primary Examiner* — Umut Onat
(74) *Attorney, Agent, or Firm* — Polsinelli PC

(57) ABSTRACT

The present technology pertains to responding to a kernel level file event for a content item and presenting a file event window associated with the content item. A client device can detect the kernel level file event for the content item. This can be accomplished using a kernel extension on a client device that is networked with a content management system. The client device can then retrieve data associated with the content item, including an instruction for the content item. The client device can then perform the instruction. This instruction can be to retrieve collaboration data from the content management system and present the collaboration data in a file event window.

15 Claims, 11 Drawing Sheets

(51) Int. Cl.
    *G06F 16/13*    (2019.01)
    *G06F 16/178*    (2019.01)
    *G06F 16/18*    (2019.01)

(56) References Cited

U.S. PATENT DOCUMENTS

| | | |
|---|---|---|
| 8,387,047 B1 | 2/2013 | Mazin et al. |
| 8,817,053 B2 | 8/2014 | Robert et al. |
| 2004/0139178 A1* | 7/2004 | Mendez ............... G06F 9/54 709/220 |
| 2005/0234866 A1* | 10/2005 | Kyler .................. G06F 9/52 |
| 2006/0090171 A1* | 4/2006 | Laborczfalvi ......... G06F 9/451 719/328 |
| 2006/0150104 A1 | 7/2006 | Lira |
| 2006/0212746 A1* | 9/2006 | Amegadzie ....... G06F 17/30221 714/6.3 |
| 2009/0024674 A1 | 1/2009 | Gallagher |
| 2014/0007181 A1* | 1/2014 | Sarin .................. G06F 21/50 726/1 |
| 2015/0013014 A1 | 1/2015 | Daniel et al. |
| 2015/0081624 A1 | 3/2015 | Masse et al. |
| 2015/0127754 A1 | 5/2015 | Clark et al. |
| 2015/0213051 A1* | 7/2015 | Wang ............... G06F 17/30174 707/613 |
| 2018/0039652 A1 | 2/2018 | Nichols |

\* cited by examiner

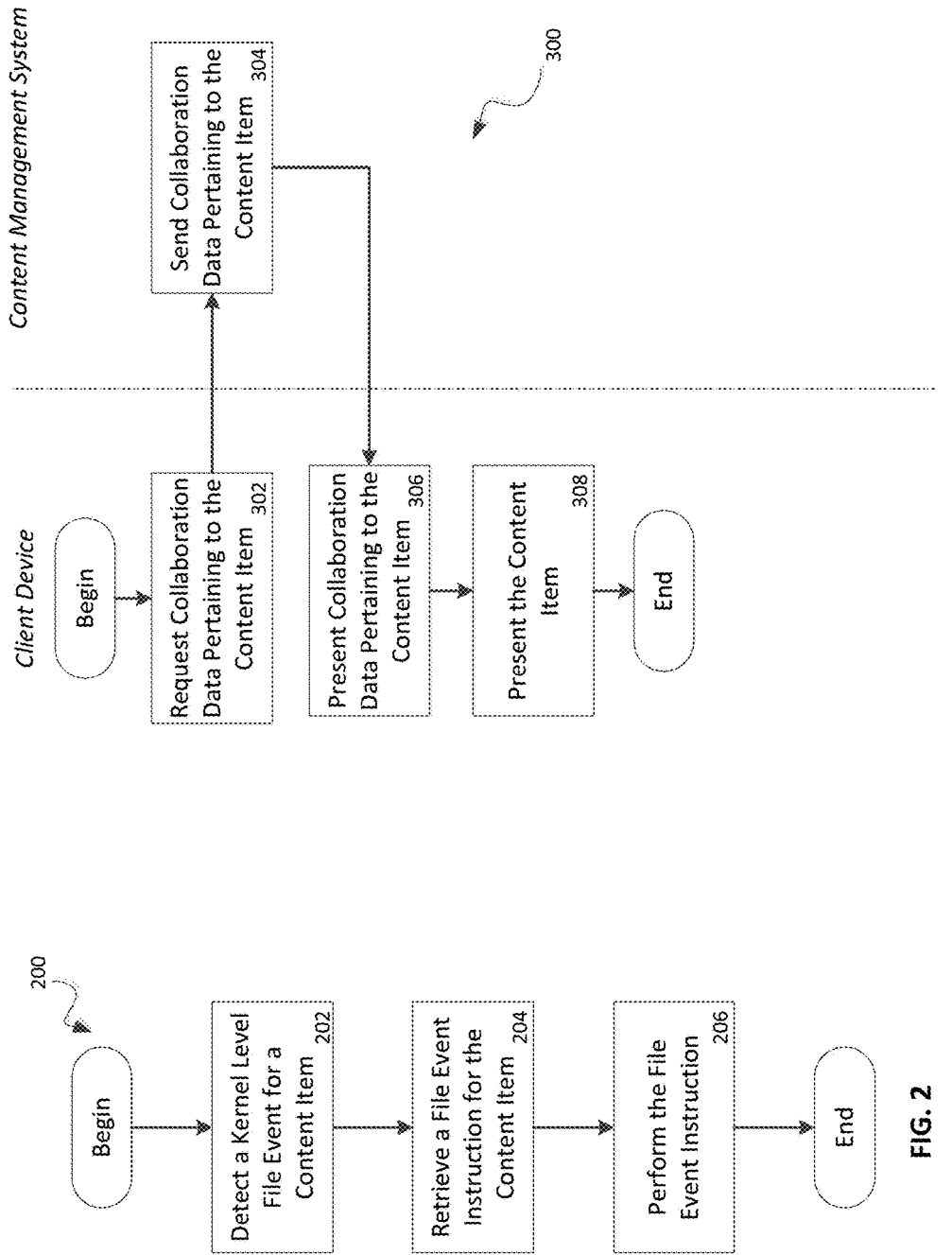

KERNEL EVENT TRIGGERS

CROSS REFERENCE TO RELATED APPLICATIONS

This application claims the benefit of U.S. provisional application No. 62/439,373, filed on Dec. 27, 2016, which is expressly incorporated by reference herein in its entirety.

BACKGROUND

As collaborative workflows gain popularity, systems have been developed to allow simultaneous editing, commenting, messaging, etc. These implementations vary between content item types, systems, and applications. Collaborators using various content item types, systems, and applications have difficulty maintaining the disjointed collaborative workflows. Because of these limitations, collaborators typically use a parallel workflow: one workflow for content item manipulation and another workflow for communication. For example, collaborators might use a document management system to store their content items and email to communicate about those content items. Many of these limitations are retained in collaborative environments as a result of traditional desktop file management paradigms and legacy applications.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for kernel event triggers.

An example computer implemented method to perform an instruction in response to a kernel level file event includes detecting the kernel level file event for a content item. This can be accomplished using a kernel extension on a client device that is networked with a content management system. The client device can then retrieve data associated with the content item, including instructions for handling or presenting for the content item. The client device can then perform the instruction. This instruction can be to retrieve collaboration data from the content management system and present the collaboration data, restrict access or rights to a file, etc.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 2 shows an example method for detecting a kernel level file event according to various embodiments;

FIG. 3 shows an example method for performing an event instruction according to various embodiments;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
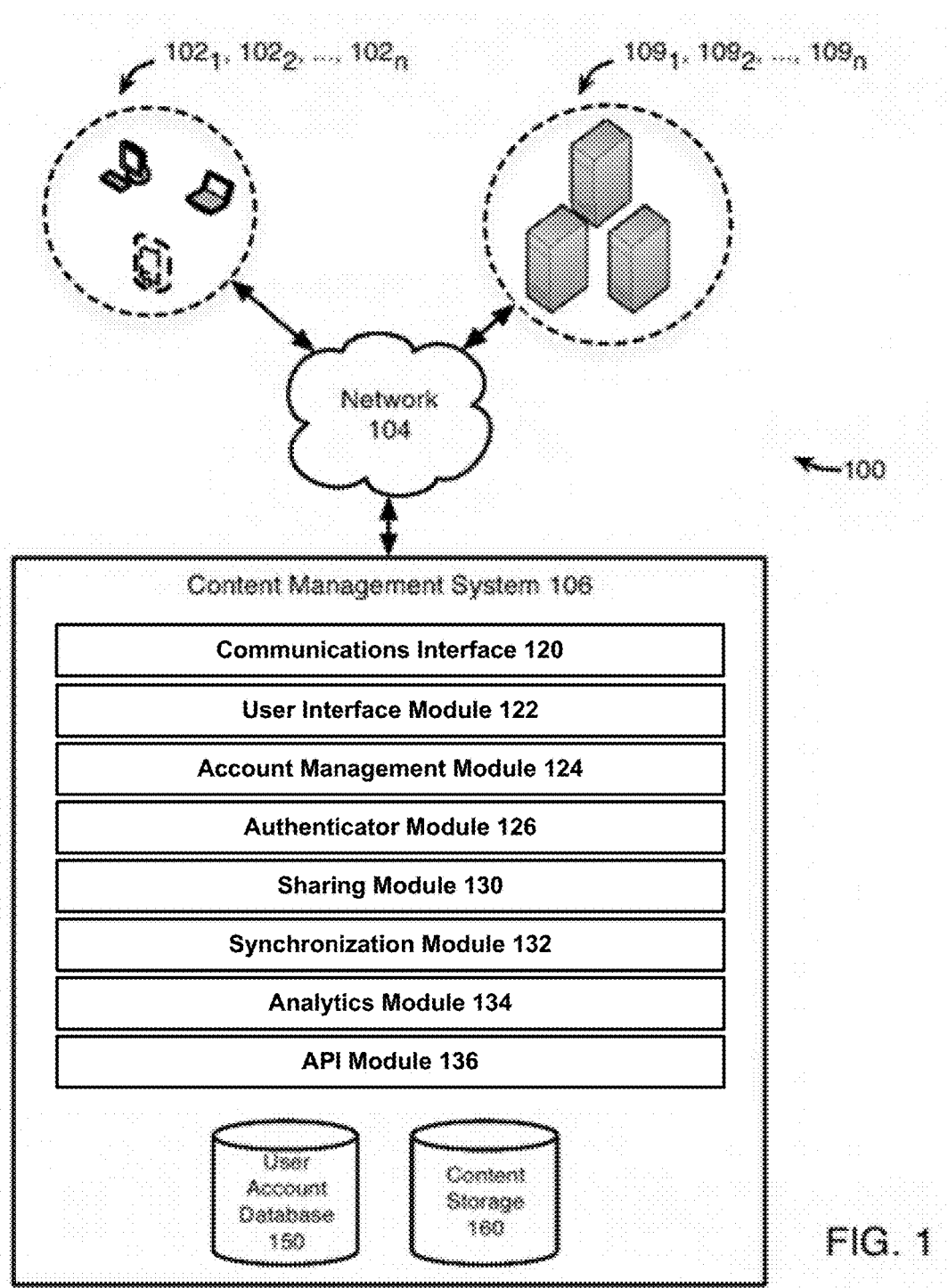
FIG. 1 shows an example configuration of devices and a network in accordance with some embodiments.

With respect to implementing various embodiments of the disclosed technology, an example system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 (e.g., an online synchronized content management system, or content management system server) through client devices 102₁, 102₂, . . . , 102n (collectively "102") connected to network 104 by direct and/or indirect communication. Content management system 106 can support connections from a variety of different client devices, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a networked content item client-side application installed on client device 102$i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device 102$i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can enable a user to store content, as well as perform a variety of content management tasks, such as retrieve, modify, browse, and/or share the content. Furthermore, content management system 106 can enable a user to access the content from multiple client devices 102. For example, client device 102$i$ can upload content to content management system 106 via network 104. Later, the same client device 102$i$ or some other client device 102$j$ can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type (e.g. free or paid), usage information, (e.g. file edit history), maximum storage space authorized, storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device 102$i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device 102$i$ can include client software, which synchronizes, via a synchronization module 132 at content management system 106, content in client device 102$i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In one example of client software that integrates with an existing content management application, a user can manipulate content items directly in a local collection, while a background process monitors the local collection for changes and synchronizes those changes to content management system 106. Conversely, the background process can identify content that has been updated at content management system 106 and synchronize those changes to the local collection. The client software can provide notifications of synchronization operations, and can provide indications of content statuses directly within the content management application. Sometimes client device 102*i* may not have a network connection available. In this scenario, the client software can monitor the linked collection for content item changes and queue those changes for later synchronization to content management system 106 when a network connection is available. Similarly, a user can manually start, stop, pause, or resume synchronization with content management system 106.

A user can view or manipulate content via a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers 109$_1$, 109$_2$, . . . , 109$_n$ (collectively "109") via an Application Program Interface (API). Certain software applications can access content storage 160 via an API Module 136 on behalf of a user. For example, a software package, such as an app running on a smartphone or tablet computing device, can programmatically make calls directly to content management system 106, when a user provides credentials, to read, write, create, delete, share, or otherwise manipulate content. Similarly, the API Module 136 can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or fewer components are possible.

FIG. 2 shows an example method 200 for detecting a kernel level file event for a content item according to various embodiments. A system performing example method 200 (e.g., client device 102) can begin and detect a kernel level file event for a content item (step 202). A content management system client application can have a kernel extension for an operating system on client device 102 to perform at least some of example method 200. As used herein, the "kernel" is a central part of an operating system that manages tasks that interface with hardware. It should be understood that "hardware" can mean physical hardware, simulated hardware (e.g., within a virtual machine, a network resource, a partition of a drive, buffer, RAM, etc.), or any system that has similar functionality of a hardware component. Similarly, a "kernel level file event" can be any event dealing with the file, content item, or resource at a hardware (or similar) level. For example, loading a file (e.g., opening or accessing the file), saving a file, modifying a file, accessing file properties, modifying file properties, moving a file, duplicating a file, defragmenting a file, etc. It should be understood that a kernel level file event can be an attempt at making any one of the foregoing, even if it is not accomplished (e.g., attempting to access a file that no longer exists, attempt to open a file without sufficient permissions, etc.). The kernel level file event can be detected using a kernel extension of client device 102 that is installed in the kernel of the operating system of client device 102.

In some embodiments, the kernel level file event can directly trigger step 202; alternatively, the system can monitor kernel level file events (e.g., by referencing a log) and begin step 202 when such an event is detected in the log. In some embodiments, step 202 pauses or otherwise interrupts the default operating system action for the kernel level file event (e.g., if a program instructs the operating system to open a file, step 202 would pause or at least temporarily prevent the opening of the file), alternatively, default behavior for the kernel level file event can run in parallel with example method 200. The kernel level file event can be triggered by a graphical user interface to a local file system (e.g., a file browser). In some embodiments, the kernel level file event is triggered by an interface (e.g., an application programming interface) to the local file system.

The system can continue and retrieve a file event instruction for the content item (step 204). A file event instruction can be any type of instruction, including instructions associated with the content item. For example, the instruction can include displaying a graphical user interface object, delaying the kernel level file event, sending a message about the content item (e.g., to content management system 106, another client device 102, a module on client device 102, a user account associated with the content item, etc.), decrypting/encrypting the content item, displaying a warning about the content item, modifying the content item, scanning the content item, duplicating the content item, retrieving collaboration information about the content item, retrieving a complete version of the content item (e.g., if the file event corresponds to a content item stub), etc.

The file event instruction can be retrieved from content management system 106 and/or client device 102. For example, the file event instruction can be stored on content management system 106 and retrieved by client device 102. The file event instruction can be retrieved from metadata associated with or located within the content item. In some embodiments, the metadata contains an address or pointer identifying a location of the file event instruction. In some embodiments, a general instruction (e.g., to open a collaboration screen before opening the content item) can apply to multiple content items and the implementation of the general instruction can be specific to the content item based on characteristics (e.g., file type, tags, permissions, metadata, etc.) of the content item. This can be accomplished, for example, by using a content item identifier to adapt a general file event instruction to be specific to the content item.

The system can then perform the file event instruction (step 206). Various embodiments are herein disclosed for example sub-methods for step 206. In some embodiments, client device 102 can send a report of any one of step 202, 204, and/or 206 to content management system 106.

An example instruction of step 206 can include an instruction for handling or presenting the content item in cooperation with content management system 106. For example, content management system 106 can send client device 102 an access instruction (e.g., to open the content item in a read only, full access, or limited access mode) and an application that opens the content item can open the content item according to the access instruction.

FIG. 3 shows an example method 300 according to various embodiments. For example, example method 300 can be an example of performing an event instruction (of step 206). Client device 302 can begin and request collaboration data pertaining to the content item (i.e., the content item of example method 200) (step 302). The request for collaboration data can be sent to content management system 106. In some embodiments, the request includes a content item identifier (e.g., a filename, path, hash, etc.). The request can be authenticated using an account identifier associated with a user account on content management system 106.

Content management system 106 can then send collaboration data pertaining to the content item (step 304). For example, step 304 can include sending comments, change history (e.g., a modification log), tasks/assignments, status (e.g., whether one or more users are currently editing or viewing a document, whether the content item is accessible), etc. associated with the content item. In some embodiments, the collaboration data is primarily directed to the content item and not specific user accounts. Alternatively or additionally, the collaboration data can be based on a user account associated with the request (e.g., collaboration data can be filtered). For example, a user might have limited permissions associated with the content item and might not be permitted to access all comments associated with the content item.

Collaboration data can facilitate coordination between multiple users (e.g., user accounts) associated with the content item. For example, a joint workflow can include tagging users, assigning tasks to users, commenting on the content item, sharing the content item, etc.

Content management system 106 can send collaboration data in many different forms. For example, step 304 can include generating a renderable web page (e.g., HTML) for rendering on client device. Alternatively, content management system 106 can send collaboration data as a data object (e.g., JSON file, XML data, or any other type of data object).

In some embodiments, step 304 is performed before step 302 (e.g., during a synchronization process).

Client device 102 can continue and receive the collaboration data from content management system 106. Client device 102 can then present the collaboration data pertaining to the content item (step 306). In some embodiments, step 306 includes presenting a web view of a web site generated by content management system 306. The collaboration data pertaining to the content item can be presented by an application that is different from the application that will or would open the content item.

Client device 102 can continue and present the content item (step 308). Step 308 can be performed by a content item application, that is, the application that opens the content item. Client device 102 can present the content item alongside, behind, in front of, etc. the presentation of the collaboration data. The presentation of the collaboration data pertaining to the content item can include an option to continue to open the content item; in some embodiments, client device 102 can perform step 308 in response to a user selecting that option. Client device 102 can perform step 308 after the presentation of the collaboration data is closed or otherwise de-focused.

In some embodiments, the metadata for a content item can be termed work flow data while content management system 106 can be termed a work flow server.

In some embodiments, client device 102 presents the collaboration data within the presentation of the content item. For example, if the collaboration data includes comments, client device 102 can insert the comments within the content item.

Figure 4:
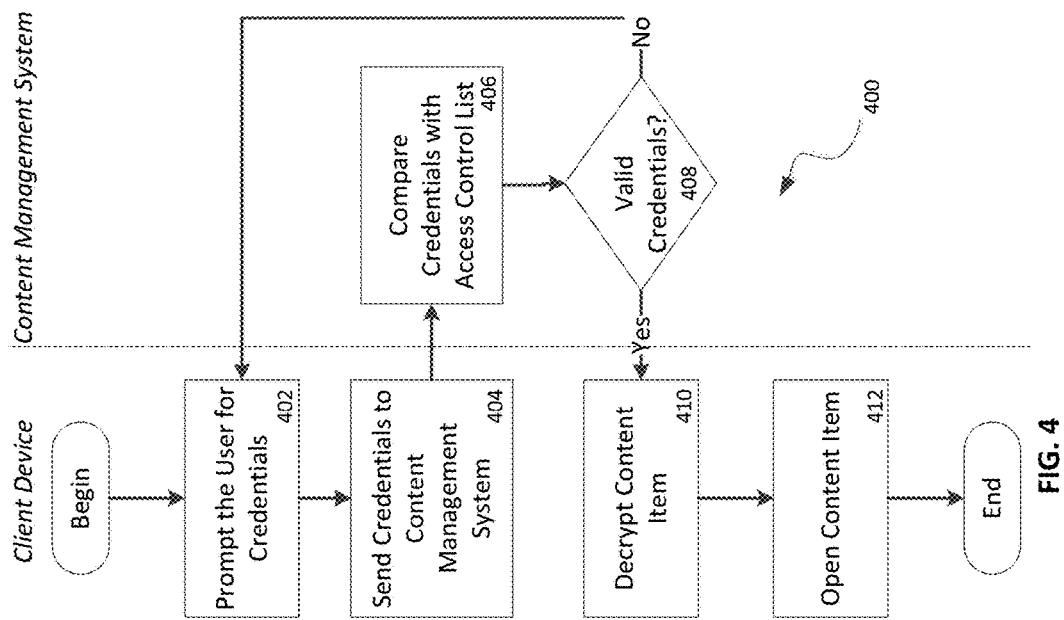
FIG. 4 shows an example method for decrypting a content item according to various embodiments.

FIG. 4 shows an example method 400 according to various embodiments. Example method 400 can be a submethod of step 206. In some embodiments, a content item may be located on client device 102 in an encrypted form. Example method 400 can be used to decrypt the content item "just-in-time" before it is opened. In some embodiments, the content item retains its legacy extension (e.g., ".txt" for a text file) even though the file type might not natively support encryption (or the native encryption for the file type is not utilized). Client device 102 can begin and prompt the user for credentials (step 402). Step 402 can include presenting a graphical user interface window indicating that the content item is encrypted and that a user can supply relevant credentials. For example, the user can supply an account identifier and password for an account on content management system 106.

Client device 102 can then send the credentials to content management system 106 (step 404). In some embodiments, step 404 includes sending additional information such as a device descriptor (e.g., indicating that client device 102 is a phone, tablet, laptop, desktop, etc.), device identifier (e.g., a serial number, MAC address, etc. for client device 102), geo-location of client device 102, etc. This additional information can inform content management system 106 about whether to permit unlocking the content item. For example, in a data loss prevention system, it can be important that a user is authorized and that the user is using an approved device.

Content management system 106 can then compare the credentials with an access control list (406). The access control list can be associated with the content item, a folder containing the content item, the requesting user, and/or a user group. The access control list can specify which users, locations, devices, times, etc. can access the content item.

Content management system 106 can then determine whether the credentials are valid (step 408). If they are not valid, content management system 106 can notify client device 102 that the credentials are invalid. Client device 102 can return to step 402 and prompt the user for credentials. Without proper credentials, client device 102 can deny access to the content item.

If content management system 106 determines that the credentials are valid in step 408, it can authorize client device 102 to decrypt the content item (step 410). For example, it can send an instruction to decrypt the content item and/or it can send a decryption key to decrypt the content item.

Client device 102 can then open the content item (step 412). This can be accomplished through various means. For example, client device 102 can replace the encrypted version of the content item with a decrypted version of the content item in the file system. Another example includes saving a decrypted version of the content item in a temporary location (while leaving the encrypted version of the content item untouched) and opening the decrypted version from the temporary location. Another example includes passing a decryption key to an application that will both decrypt and open the content item. In some embodiments, the original file event is paused until the steps of example method 400 are performed. This can allow client device 102 to modify the content item just-in-time (e.g., replacing the content item on the storage medium) without the operating system or event-generating program needing any extra configuration. This technique can be applied to multiple concepts herein disclosed and should not be limited to example method 400.

In some embodiments, steps 406 and 408 are performed on client device 102. For example, a security application can validate the credentials. In some embodiments, the credentials directly create a decryption key (for example, a hash of the credentials can be the key).

Figure 5:
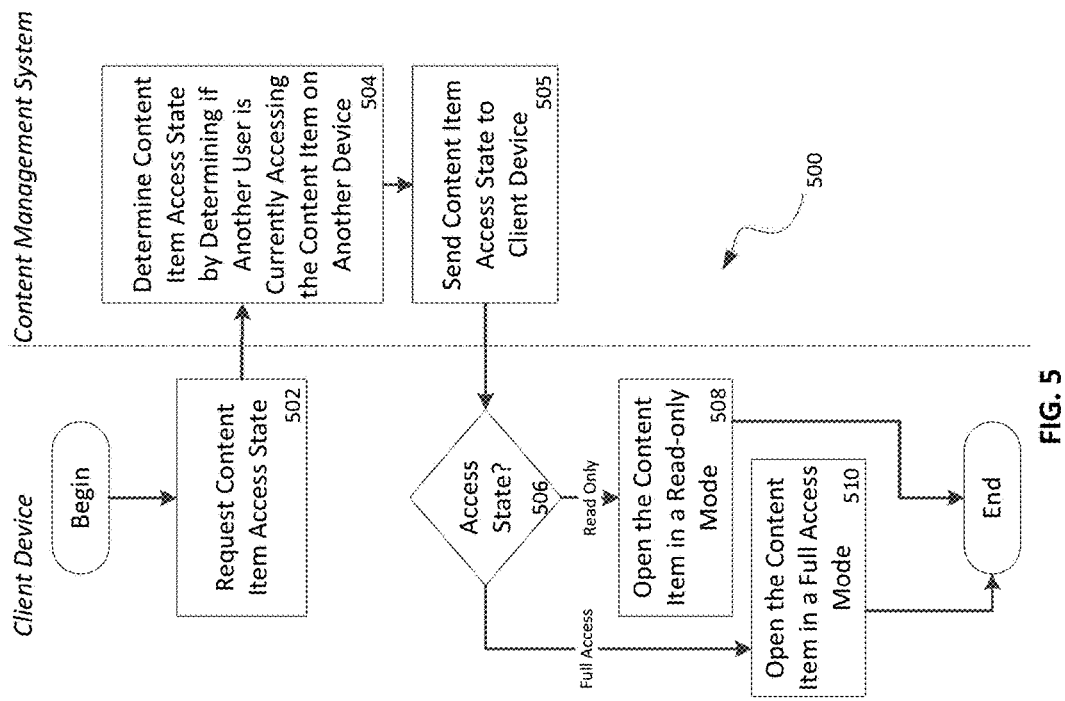
FIG. 5 shows an example method for adapting the presentation of a content item according to various embodiments.

FIG. 5 depicts an example method 500 according to various embodiments. Example method 500 can be a submethod or alternative to step 206 for adapting the presentation of the content item based on an access state for the content item. For example, if another user of another client device 102 is currently accessing the content item, the content item might be "locked" with regards to the user that is attempting to access the content item (i.e., that triggered example method 500) and prevent that user from modifying the content item.

Client device 102 can begin and request the content item access state from content management system 106 (step 502). Access state can include an indication that the content item is currently opened by, being modified by, or reserved by a user (e.g., a user account). Access state can include an indication of a user or users that are attributable to the access state. For example that user X is currently viewing the content item.

Content management system 106 can then determine the content item access state by determining if another user is currently accessing the content item on another device (step 504). The "another device" in step 504 can be another client device 102. In some embodiments, step 504 includes reading an access log on content management system 106. Step 504 can include querying any client device 102 that might be accessing the content item. Content management system 106 can then send the content item access state to client device (step 505).

If the access state (step 506) is "full access" or similar, client device 102 can then open the content item in a full access mode (step 510). For example, the content item can be assigned read and write permissions. If the access state (step 506) is "read only" or similar, client device 102 can then open the content item in a read-only mode (step 508). For example, the content item can be opened without the ability to save over the content item. It should be understood that other access states are contemplated. For example, a "check out" access state may require a user to return the content item within a certain amount of time.

In some embodiments, content management system 106 can use example method 500 to determine a file access restriction for the content item. For example, steps 504 and 505 can include determining a file access restriction for the content item. This can include comparing the content item, the requesting user (e.g., a user account associated with client device 102), client device details (e.g., an identifier for client device 102), a device type of client device 102 (e.g., phone, tablet, or laptop), and/or a location of client device 102 (e.g., geo-location, IP address, or subnet) with an access control list for the content item. The file access restriction can additionally or alternatively be determined by referring to the current activity states of other users currently associated with the content item (e.g., if they have the content item open, if they have unsaved changes to the content item, etc.). Content management system 106 can then determine a file access restriction for the request. Client device 102 can enforce the file access restriction. The file access restriction can include indicating that the content item should have read-only, full, time-limited, or otherwise limited access permissions. In some embodiments, the file access restriction limits the ability for the content item to saved or synchronized with content management system 106 (e.g., if another user account is currently accessing the content item). In some embodiments, the file access restriction applies to a portion of the content item (e.g., a sentence, paragraph, page, row, column, cell, section, etc.). In some embodiments, client device 102 does not enforce the file access restriction, but merely presents a notification indicating the file access restriction.

Figure 6:
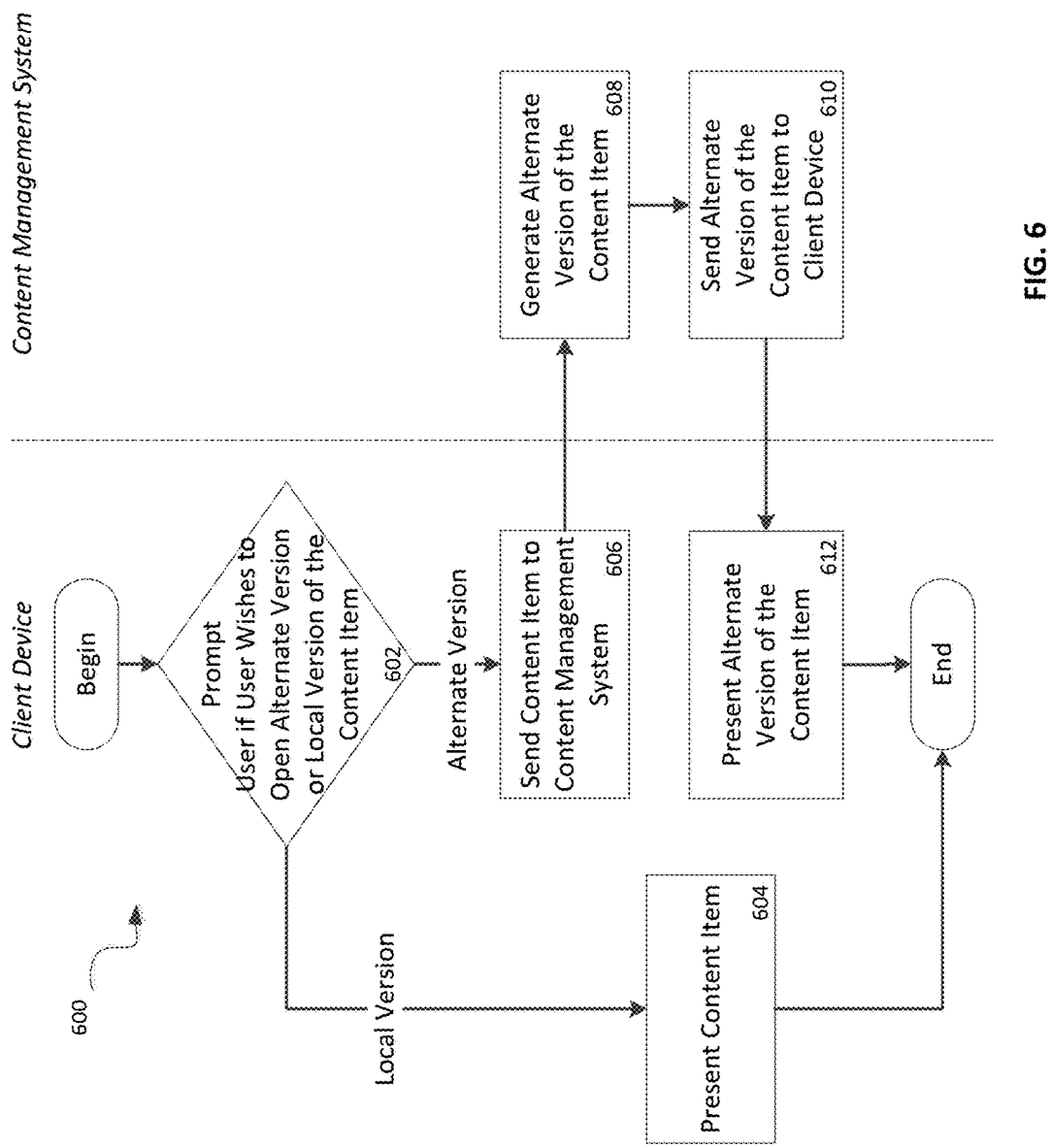
FIG. 6 shows an example method for dynamically converting a content item according to various embodiments.

FIG. 6 shows an example method 600 according to various embodiments. Example method 600 can be a sub-method of step 206. Example method 600 can facilitate dynamic conversion of a content item so that the content item can be opened in an alternative form. Client device 102 can prompt the user if the user wishes to open an alternate version or the local version of the content item (step 602). "Local version" can mean the version of the content item associated with the file event (i.e., the version of the content item that would be opened if the methods herein disclosed were not ignored). "Alternate version" can mean an alternate representation of the content item which can be derived from the local version. For example, the local version of the content item can be an editable text document and the alternate version can be a portable document format (e.g., "pdf"), a picture (e.g., ".jpg"). In some embodiments, the alternate version of the content item can be a different form than the local version; for example, if the local content item is a text document, the alternative version can be an audio reading of the text document. The alternative version of the content item can include more or less information in comparison to the local version. For example, the alternate version can include or exclude inline comments. Other examples of an local version of content item and respective alternate version include: minified programming code (local) can be opened as full-form programming code (alternate), a full document (local) can be opened as a summary (alternate), a movie file (local) can be opened using different content filters/resolution/audio track/subtitles/etc. (alternate), a 3D CAD model (local) can be opened as a picture or video tour of the model (alternate), a program (local) can be opened in a protected sandbox environment to prevent malicious code (alternate), a document in one format (local) can be opened using a web-based editor (alternate), a song sample (local) can be opened as a paid full song (alternate), a local draft document (local) can be opened as an updated version of the document (alternate), etc. It should be understood that local and alternate relationships herein disclosed can be reversed; i.e., something referenced as a "local" version can be an "alternate" version and vice versa.

If a user selects the alternate version, client device 102 can send the content item to content management system (step 606). In some embodiments, client device 102 can merely send a content item identifier to content management system 106.

Content management system 106 can then generate an alternate version of the content (step 608). In some embodiments, this. This can include modifying the content item or retrieving the alternate version of the content item.

Content management system 106 can then send the alternate version of the content item to client device (step 610). In some embodiments, this includes sending web page code for presentation on client device 102. For example, the original version can be a text document and the alternate version can be a web presentation of the text document with more or less functionality than a local text editor application.

Client device can then present the alternate version of the content item (step 612). This can include rendering a website containing the alternate version of the content item. If the user selects to open the local version of the content item at step 602, client device can present the content item (step 604). In some embodiments, client device 102 can present the local version of the content item and the alternate version of the content item simultaneously.

In some embodiments, the "local" version is a stub content item while the "alternate" version is the complete content item. The term "stub" can refer to a placeholder that appears to be the complete content item within a file browser but the actual content item is located elsewhere. For example, the stub can be a file with the same name, extension, metadata, etc. even though the stub lacks much of the content (i.e., the substance) of the content item. The stub can appear within a file interface of client device 102 to be the complete version of the content item. Client device 102 can detect a kernel level event for the stub content item and request the complete content item from content management system 106. Content management system 106 can then provide the complete content item to client device 102 for presentation. For example, the complete version can replace the stub in the file system. Alternatively or additionally, the complete version can be saved in a temporary location and the kernel level file event can be modified to point to the complete version (e.g., by changing the path for the content item). An application for presenting (including opening or loading) the content item can open the full version despite the stub being originally identified. When presentation of the content item is concluded (e.g., when the associated application closes the content item or saves the content item), client device 102 can update the stub content item and, if necessary, send an updated version of the complete content item to content management system 106.

Figure 7:
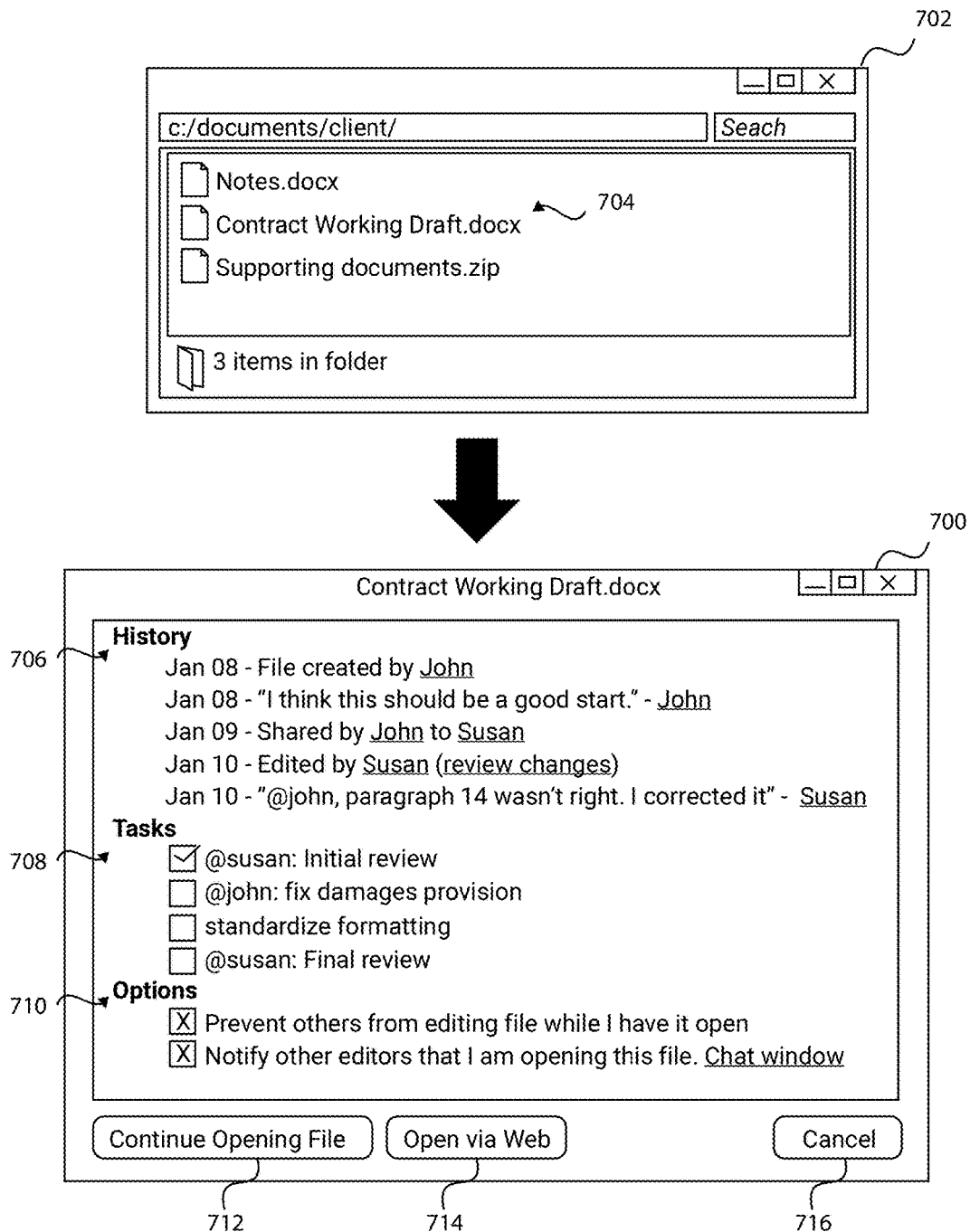
FIG. 7 shows an example file event window according to various embodiments.

FIG. 7 shows an example file event window 700 according to various embodiments. When a content item is selected (e.g., content item 704) from file browser 702, file event window 700 can be presented. For example, file browser 702 can trigger a kernel level file event for the content item upon receiving a selection to access the content item. File event window 700 can be created in steps 206, 306, 402, and/or 602 of the aforementioned methods. In some embodiments, file event window 700 is a rendering of a web page generated by content management system 106. File event window 700 can be interactive and can be dynamically updated.

It should be understood that various kernel level file events can trigger file event window 700. For example, a kernel level file event for opening, requesting (e.g., from a network location), saving, closing, releasing, committing (e.g., committing changes), or otherwise signaling the initiation or completion of an activity with the associated item can trigger file event window 700.

In FIG. 7, file event window 700 can include history 706, tasks 708, and options 710 for content item 704. In some embodiments, history 706, tasks 708, and/or options 710 are generated from content management system 106; additionally or alternatively, they can be informed by metadata for content item 704. History 706 can include file operations history (e.g., when the file was created, named, moved, shared), file content history (e.g., changes and edits made to content item 704), comment history (e.g., comments that users have submitted relative to content item 704), view history, etc.

Tasks 708 can include tasks assigned to the user account associated with the file event request (e.g., a user account associated with client device 102). Tasks 708 can also include tasks assigned to other user accounts. In some embodiments, only relevant tasks are presented. For example, the next task that should be done (e.g., by the user that triggered the file event). Tasks 708 can include modifiable elements so that a user can change the status of a task (e.g., not started, in progress, or complete). Content management system 106 can analyze changes made to a content item to automatically determine if a task is completed. For example, if the task is to review edits in a tracked-changes file, content management system 106 can detect that each of tracked changes are "accepted" or otherwise approved. In some embodiments, content management system 106 can receive an instruction to mark the task as completed.

Options 710 can include options for opening the content item. For example, other users can be prevented from opening the content item. Another example includes notifying others that have subscribed to the content item that the current user is opening the content item. A selectable option can open up a chat window containing messages relevant to the content item.

File event window 700 can include a selectable option to continue opening the content item (button 712), to open the content item via the web (button 714), or to cancel and not open the content item (button 716). The button 714 can open an alternate version of the content item (e.g., similar to example method 600).

Figure 8:
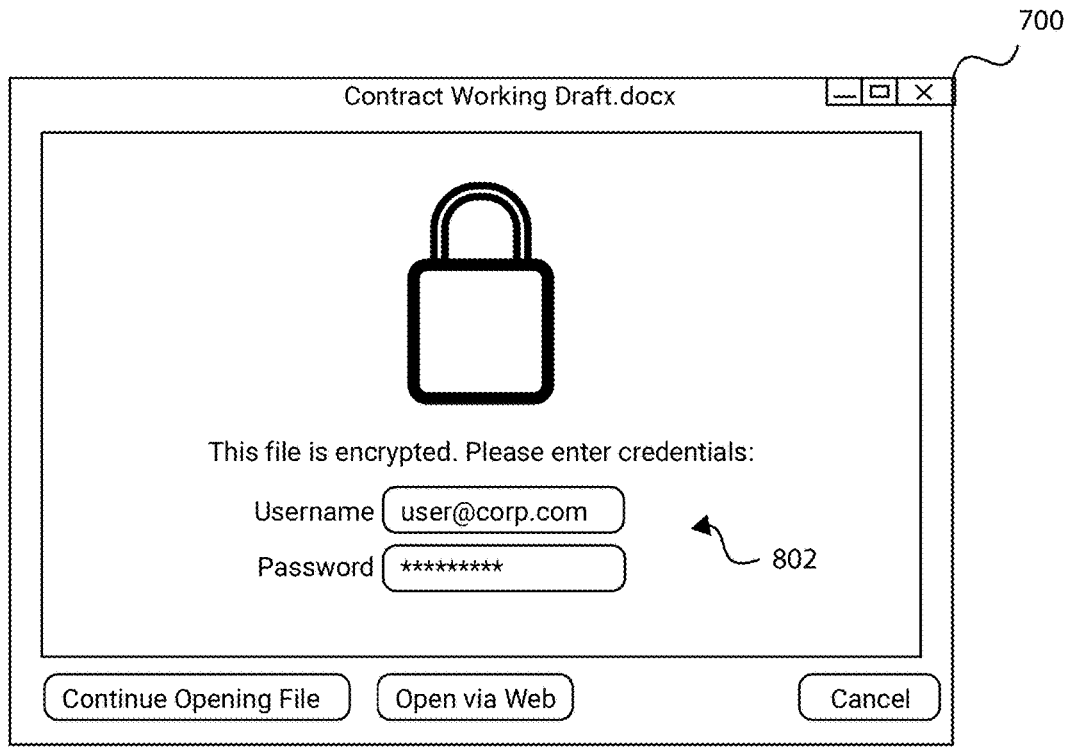
FIG. 8 shows an example file event window being used for decryption according to various embodiments.

FIG. 8 shows file event window 700 being used for decryption. For example, client device 102 can present file event window 700 when a user attempts to open an encrypted content item. A user can then input their credentials into login 802. Client device 102 can then send the credentials to content management system 106 which can return a decryption key that can be used to decrypt the content item; alternatively, client device 102 can generate the decryption from the credentials.

It should be understood that file event window 700 can enable a user to encrypt a content upon save or close. For example, saving or closing the content item can trigger the kernel level file event. Upon saving, file event window 700 can provide a user the ability to encrypt the content item.

In some embodiments, the content item is controlled using digital rights management (DRM). For example, a content item can be encrypted using a key. The kernel level file event can direct the computer to instructions for how to open and decrypt the content item. The instructions can direct the computer to a DRM server (e.g., content management system 106 or another server) which can provide a key for decrypting the content item. This can include verifying a user account associated with the kernel level file event or computer. In some embodiments, the instructions (e.g., DRM data) for accessing (or opening) the content item are retrieved from the DRM server. In some embodiments, the content item is a stub and the instructions direct the computer to a location where the complete content item is located. The content item at the new location can be encrypted or unencrypted.

Figure 9:
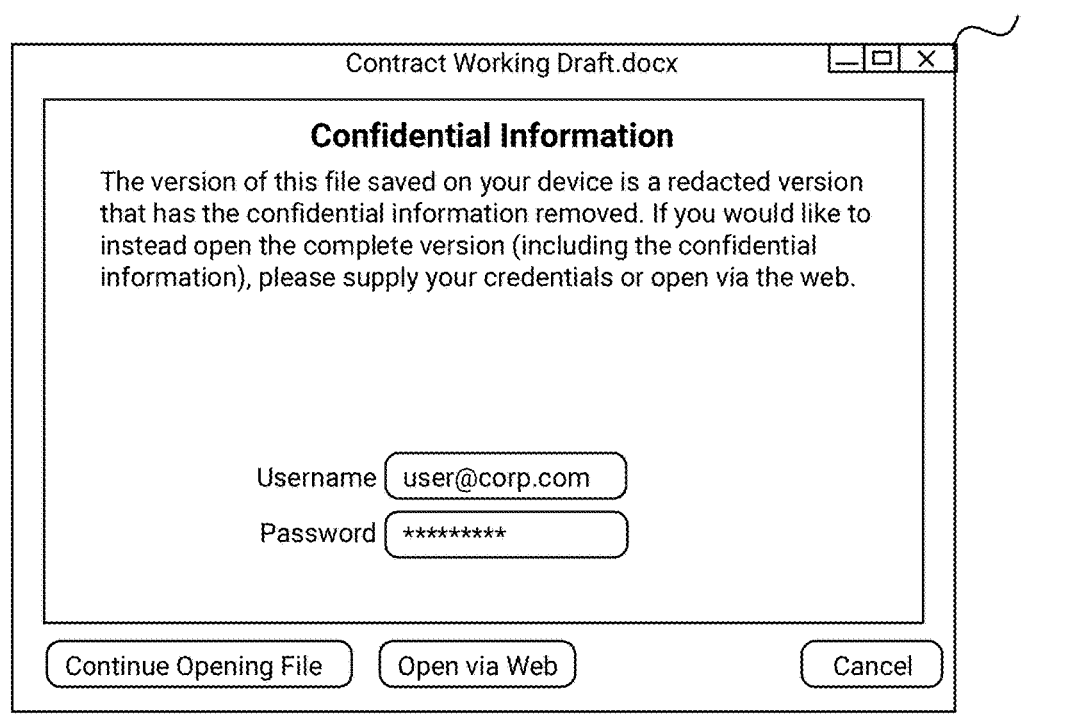
FIG. 9 shows an example file event window being used for data loss prevention according to various embodiments.

FIG. 9 shows file event window 700 being used for data loss prevention. For example, a content item can be identified to include sensitive information. This can happen just-in-time or at a prior time. If the content item contains sensitive information, a redacted version can be stored locally on client device 102 while the original version can be stored on content management system 106. In order to retrieve the original version, a user can supply their credentials and the original version can be retrieved. In some embodiments, a stub content item is stored on client 102 and, after the user is validated, content management system 106 can send the content item (or an appropriately redacted version of the content item) to client device 102.

In some embodiments, client device 102 can detect that a content item is saved or closed. After detecting a save or close kernel level file event, client device 102 or content management system 106 can detect that the content item possibly contains confidential information. In some embodiments, in order to commit (e.g., save) the content item, the user must provide credentials.

Figure 10:
FIG. 10 shows an example file event window being used for signature acquisition according to various embodiments.

FIG. 10 shows file event window 700 being used to acquire a signature. For example, when opening a content item, a user can provide their signature showing that they agree to certain terms (or conditions) for accessing the content item or acknowledge receipt of the content item. For example, file event window 700 can include an end user license agreement, a copyright notice, a non-disclosure agreement, etc. File event window 700 can be presented when a content item is closed and a user can represent that they assent to the contents of the content item or that they approve its contents. In some embodiments, a user can supply their authorization by applying a signature to file event window.

In some embodiments, client device 102 can present file event window 700 for a signature request after saving or closing the associated content item. Such a signature request can be for authorizing the content item or agreeing to terms of the content item. For example, a manager can sign off on terms within the content item.

Client device can save the signature provided by file event window 700 as metadata for the content item or as a separate content item associated with the content item.

Figure 11:
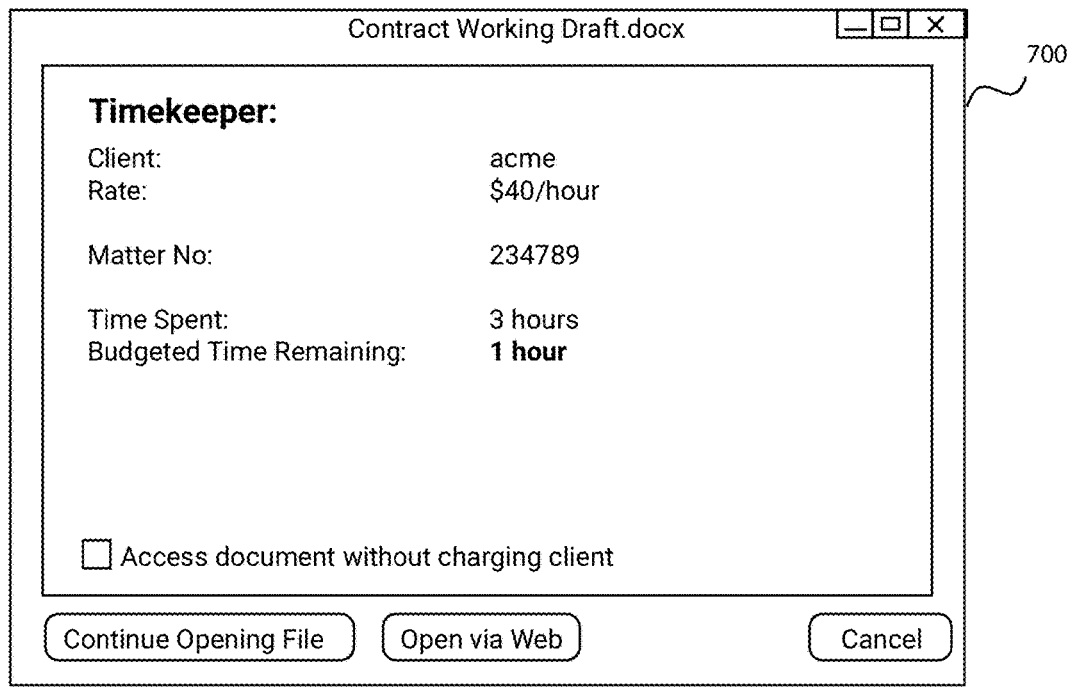
FIG. 11 shows an example file event window being used for tracking a budget according to various embodiments.

FIG. 11 shows file event window 700 being used to track a budget related to a content item. In certain professions, such as in the legal profession, accounting, creative design, etc., a set amount of time or money can be budgeted for a project. A project can be tied to a content item, for example, drafting a contract or painting a picture. File event window 700 can be used to show and track the amount of time/money that has been spent on the content item. For example, when the content item is opened, the timer can be started automatically and when the content item is closed, the timer can be stopped. An option can be presented to not log the time spent while the content item is opened.

Client device 102 can present a timer window after receiving a kernel level file event that the content item is opened, saved, or closed. In some embodiments, the file event instruction points to an application that can inform or present file event window 700. For example, in FIG. 11, the application can be a timekeeper application. It should be understood that other applications can, through an API or similar, inform or present file event window 700.

Figure 12:
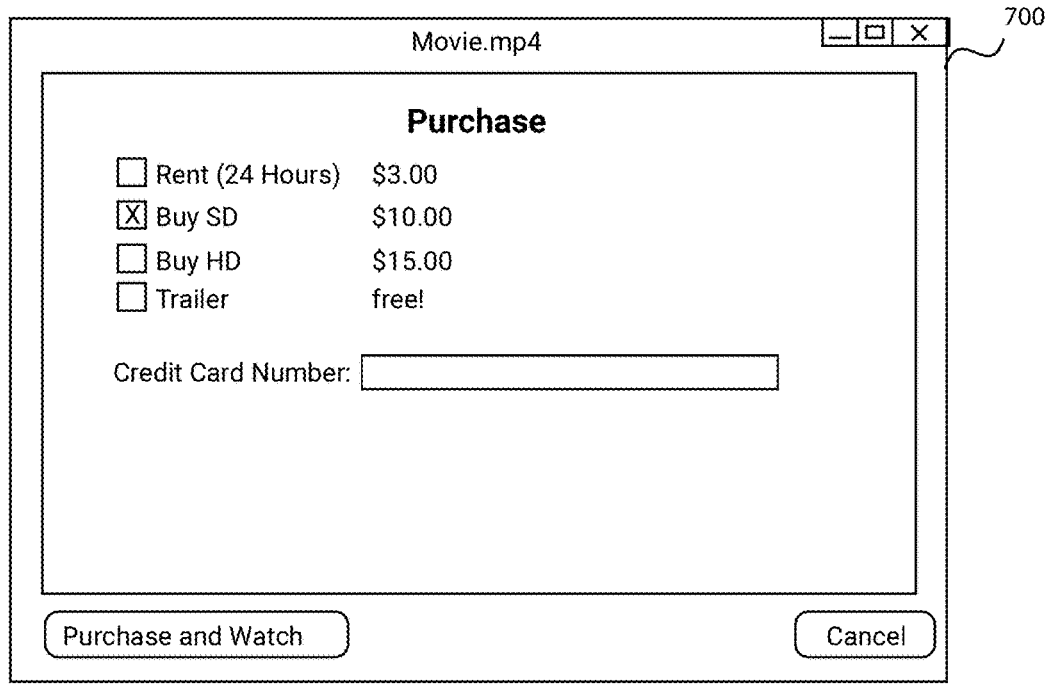
FIG. 12 shows an example file event window being used for purchasing a content item according to various embodiments.

FIG. 12 shows file event window 700 being used to display a purchase screen for a movie. For example, a movie content item can reside on client device 102 and, when a user attempts to open the movie, file event window 700 can be presented allowing the user to purchase or rent the movie. Alternatively, a stub content item can be located on client device 102. File event window 700 can present various options for the movie, for example an "HD" mode, an "SD" mode, a 24-hour rental, or just the trailer. After making a selection, payment information can be supplied and the content item (e.g., movie) can be opened in the selected form. It is important to recognize that neither the operating system nor the application (e.g., movie player) that opens the content item needs to be aware of event window 700 and the procedures herein disclosed. For example, the movie file can be a "movie.mp4" that is essentially empty (e.g., a stub content item), contain just the trailer, a low resolution copy, etc. When the kernel sends an instruction to open the content item, the instruction can be intercepted and client device can present file event window 700; the appropriate content item can then be downloaded and can replace the content item with the full one and the instruction to open the content item can be resumed. Thus, the application that opens the content item does not need to be specially configured to accommodate this added functionality.

Figure 13:
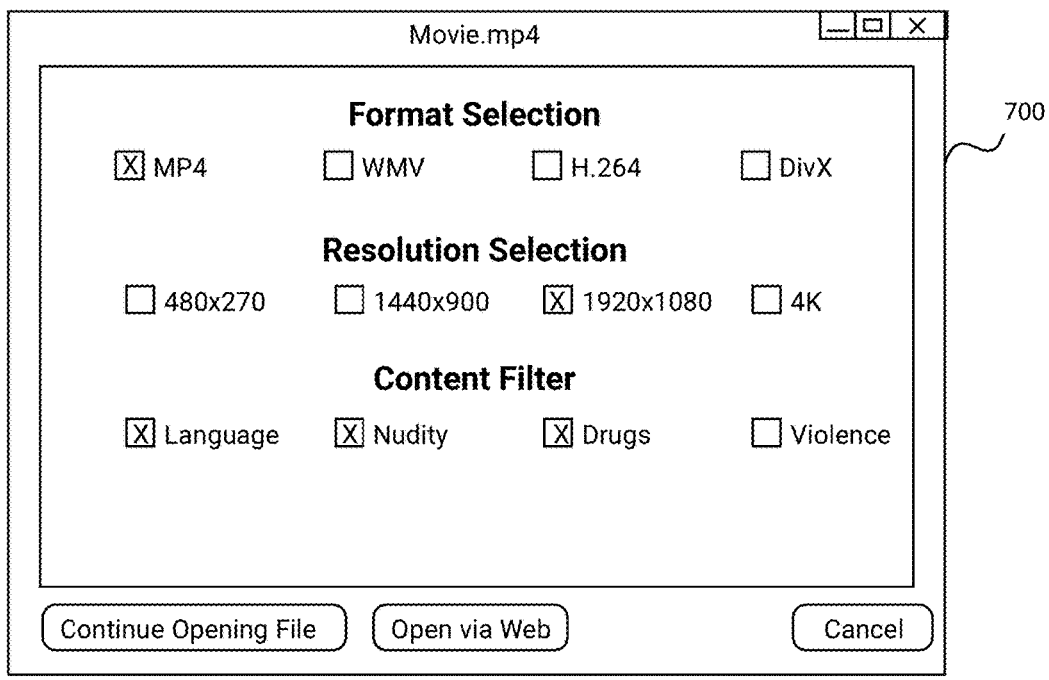
FIG. 13 shows an example file event window being used for format selection a content item according to various embodiments.

FIG. 13 shows file event window 700 being used to present format selection options for a content item. For example, a user can select the format, resolution, and content filtering for a movie. Some options of file event window 700 can be auto-filled. In some embodiments, file event window 700 is not presented; instead, client device 102 can automatically provide the optimal version of the content item based on user preferences, user permissions, client device 102 specifications, etc.

Figure 14:
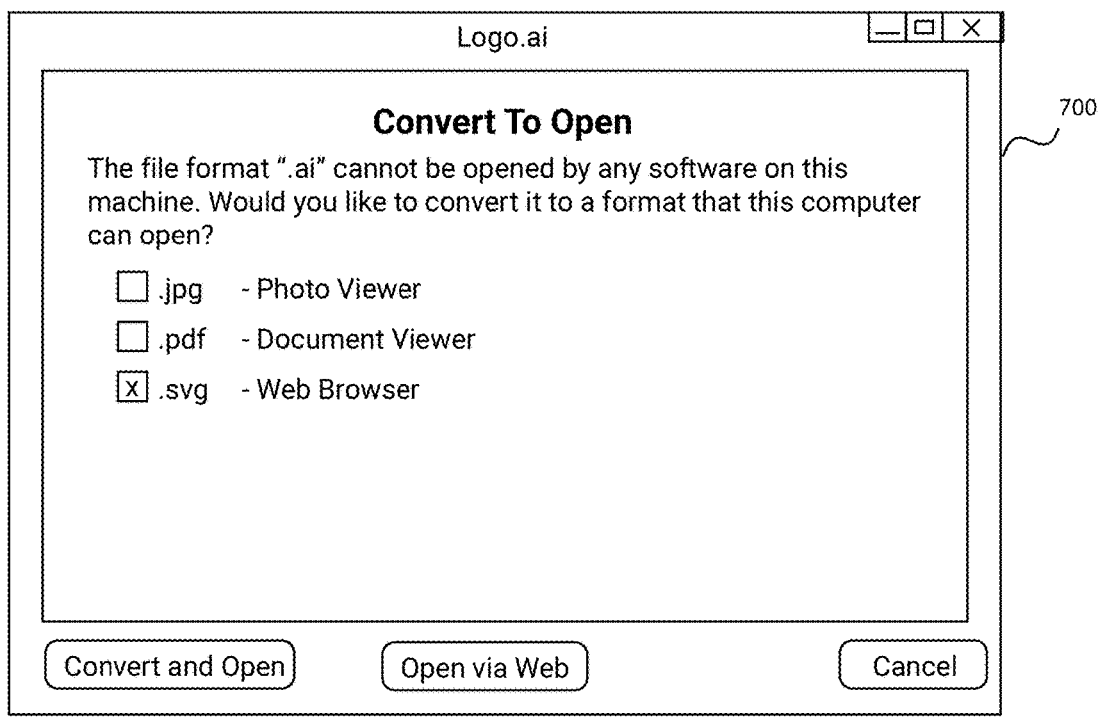
FIG. 14 shows an example file event window being used for selecting alternate versions of a content item according to various embodiments.

FIG. 14 shows file event window 700 being used to suggest alternate versions of a content item and associated applications. For example, client device 102 might not have the appropriate software to open the content item. File event window 700 can suggest alternate formats that correspond to applications that are present on client device 102. Client device 102 or content management system 106 can then convert the content item to another file (i.e., another file format) for opening by the selected application. In some embodiments, a user can select an option to open the to open the content item via a web interface; client device 102 can then send the content item to content management system 106 which can then convert the content item for a web-based presentation. Client device 102 can then receive a web URL from content management system 106 and direct a web-browser to the appropriate URL.

Figure 15:
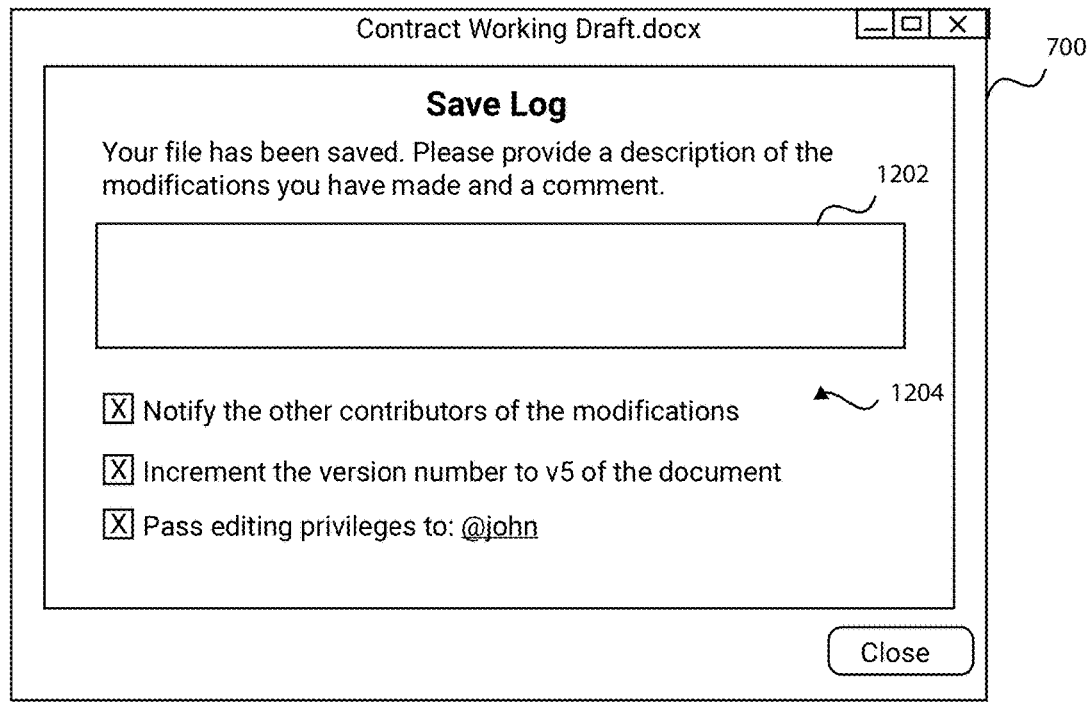
FIG. 15 shows an example file event window being used for logging changes associated with a content item according to various embodiments.

FIG. 15 shows file event window 700 being used to log changes when a content item is saved. For example, client device 102 can present event window 700 when a content item is saved. A user can supply a comment into comment box 1202. The comment can describe the changes that are being saved. Client device 102 can present the comment in other event windows 700 (e.g., when another user opens the content item, event window 700 can show the comment from comment box 1202). The comment from comment box 1202 can be synchronized with content management system 106. In FIG. 15, event window 700 can present save options 1204 which can include notifying other contributors of the modifications, incrementing the version number of the document, and/or passing editing privileges to another user. Passing editing privileges can be a form of "checking out" a content item. When the editing privileges are passed to another user, only that user can modify the content item.

In some embodiments, client device 102 can detect a modification of a content item while an application has the content item opened. For example, a user can edit a portion of a document and client device 102 can detect the modification. Client device 102 can then present a graphical user interface object similar to comment box 1202 requesting a summary or description of the modification just made. In some embodiments, the user is not allowed to make certain modifications (e.g., the user can only modify a certain portion of the content item and/or only do a certain type of modification). Client device 102 can then warn the user that the modification is not allowed. Client device 102 can revert the modification, prevent the modification from being preserved (e.g., preventing saving of the modification or preventing synchronization of the modification).

Providing collaboration opportunities when a content item is opened, saved, and/or closed can enable collaborative workflows for legacy files and applications. For example a company might need to use certain legacy applications, operating systems, environments, etc. that do not support modern collaborative paradigms (e.g., comments, notifications, tags, etc.). The principles disclosed herein can enable these and other collaborative features without disrupting the legacy applications. Importantly, even applications that support these collaborative features might not have an optimal presentation flow for these features; for example, comments and tags might be difficult to find within the application. Presenting collaborative elements before a content item is opened and after it is saved or closed can maximize a user's attention without distractions from the content item or application that accesses the content item. In other words, a user will be more attentive to file event window 700 than in-application solutions because file event window 700 is presented (in some embodiments) at file event transitions (e.g., open, save, or close).

Figure 16:
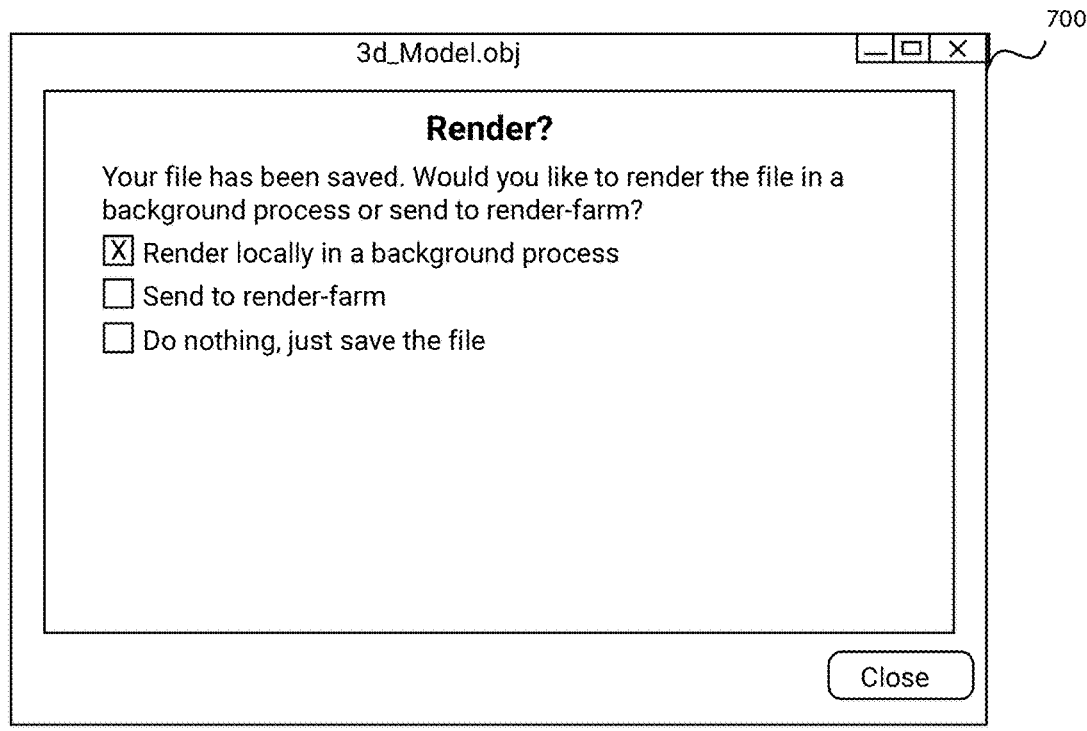
FIG. 16 shows an example file event window being used for content item exporting according to various embodiments.

FIG. 16 shows file event window 700 being used to present content item export options. For example, certain content items can benefit from being exported to another format or presentation: software can be compiled, 3D images can be rendered, videos can be encoded and rendered, documents can be saved in a portable format, emails can be sent, web sites can be published, etc. Client device 102 can present file event window 700 when the content item is saved or closed.

Figure 17B:
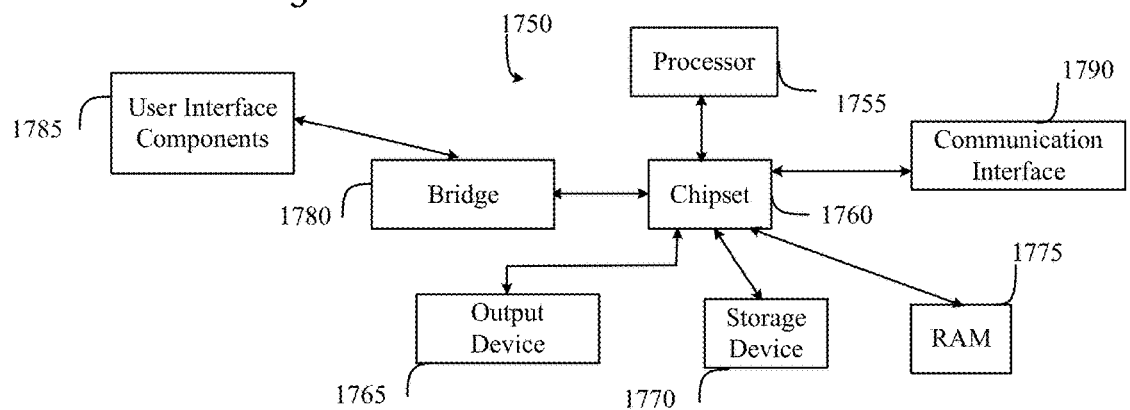
FIG. 17B shows an example possible system embodiment for implementing various embodiments of the present technology.

17A and FIG. 17B show example possible system embodiments. The more appropriate embodiment will be apparent to those of ordinary skill in the art when practicing the present technology. Persons of ordinary skill in the art will also readily appreciate that other system embodiments are possible.

Figure 17A:
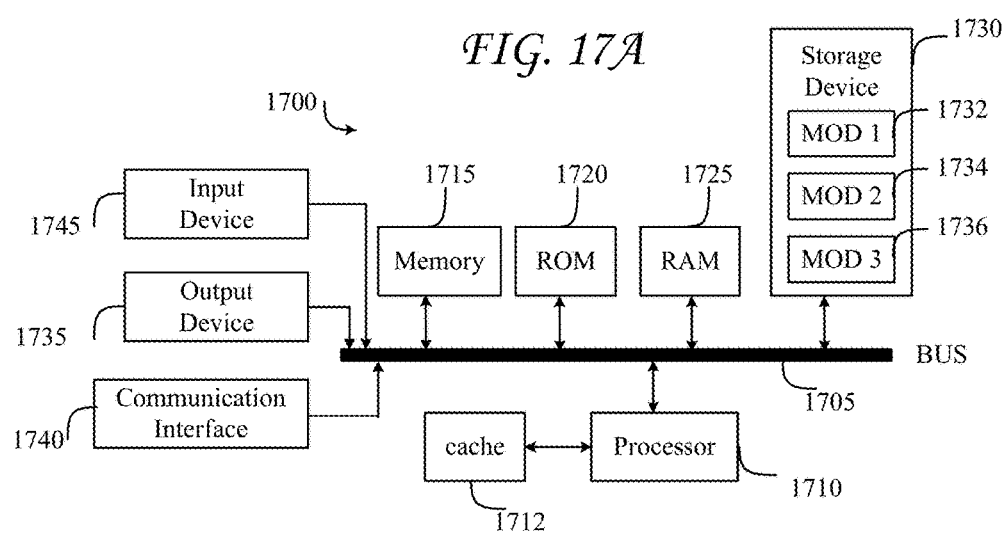
FIG. 17A shows an example possible system embodiment for implementing various embodiments of the present technology.

FIG. 17A illustrates a conventional system bus computing system architecture 1700 wherein the components of the system are in electrical communication with each other using a bus 1705. Example system 1700 includes a processing unit (CPU or processor) 1710 and a system bus 1705 that couples various system components including the system memory 1715, such as read only memory (ROM) 1720 and random access memory (RAM) 1725, to the processor 1710. The system 1700 can include a cache of high-speed memory connected directly with, in close proximity to, or integrated as part of the processor 1710. The system 1700 can copy data from the memory 1715 and/or the storage device 1730 to the cache 1712 for quick access by the processor 1710. In this way, the cache can provide a performance boost that avoids processor 1710 delays while waiting for data. These and other modules can control or be configured to control the processor 1710 to perform various actions. Other system memory 1715 may be available for use as well. The memory 1715 can include multiple different types of memory with different performance characteristics. The processor 1710 can include any general purpose processor and a hardware module or software module, such as module 1 1732, module 2 1734, and module 3 1736 stored in storage device 1730, configured to control the processor 1710 as well as a special-purpose processor where software instructions are incorporated into the actual processor design. The processor 1710 may essentially be a completely self-contained computing system, containing multiple cores or processors, a bus, memory controller, cache, etc. A multi-core processor may be symmetric or asymmetric.

To enable user interaction with the computing device 1700, an input device 1745 can represent any number of input mechanisms, such as a microphone for speech, a touch-sensitive screen for gesture or graphical input, keyboard, mouse, motion input, speech and so forth. An output device 1735 can also be one or more of a number of output mechanisms known to those of skill in the art. In some instances, multimodal systems can enable a user to provide multiple types of input to communicate with the computing device 1700. The communications interface 1740 can generally govern and manage the user input and system output. There is no restriction on operating on any particular hardware arrangement and therefore the basic features here may easily be substituted for improved hardware or firmware arrangements as they are developed.

Storage device 1730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1725, read only memory (ROM) 1720, and hybrids thereof.

The storage device 1730 can include software modules 1732, 1734, 1736 for controlling the processor 1710. Other hardware or software modules are contemplated. The storage device 1730 can be connected to the system bus 1705. In one aspect, a hardware module that performs a particular function can include the software component stored in a computer-readable medium in connection with the necessary hardware components, such as the processor 1710, bus 1705, display 1735, and so forth, to carry out the function.

FIG. 17B illustrates a computer system 1750 having a chipset architecture that can be used in executing the described method and generating and displaying a graphical user interface (GUI). Computer system 1750 is an example of computer hardware, software, and firmware that can be used to implement the disclosed technology. System 1750 can include a processor 1755, representative of any number of physically and/or logically distinct resources capable of executing software, firmware, and hardware configured to perform identified computations. Processor 1755 can communicate with a chipset 1760 that can control input to and output from processor 1755. In this example, chipset 1760 outputs information to output 1765, such as a display, and can read and write information to storage device 1770, which can include magnetic media, and solid state media, for example. Chipset 1760 can also read data from and write data to RAM 1775. A bridge 1780 for interfacing with a variety of user interface components 1785 can be provided for interfacing with chipset 1760. Such user interface components 1785 can include a keyboard, a microphone, touch detection and processing circuitry, a pointing device, such as a mouse, and so on. In general, inputs to system 1750 can come from any of a variety of sources, machine generated and/or human generated.

Chipset 1760 can also interface with one or more communication interfaces 1790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1755 analyzing data stored in storage 1770 or 1775. Further, the machine can receive inputs from a user via user interface components 1785 and execute appropriate functions, such as browsing functions by interpreting these inputs using processor 1755.

It can be appreciated that example systems 1700 and 1750 can have more than one processor 1710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system for enforcing instructions for handling or presenting a content item on a client device, wherein synchronized copies of the content item are stored in association with a user account at a content management system server, and at least one storage of the client device that is authorized to access the user account at the content management system server, the system comprising:

the client device including the at least one storage including software code for an operating system, a content management system client application, a kernel extension of the content management system client application, and a content item application, and the client device including at least one processor configured to execute the software code, when executed, causing the at least one processor to:

detect a kernel level file open event for the content item in the at least one storage of the client device, wherein the event is the result of a file open command that originates in a user interface to a local file system of the operating system;

interrupt the kernel level file open event for the content item in the at least one storage of the client device; and in response to the interrupting the kernel level file open event, retrieve from the at least one storage an instruction specific to the content item for presenting the content item in cooperation with the content management system server;

the client application to contact the content management system server according to the instruction;

present by the client application an option to receive an alternate version of the copy of the content item stored at the at least one storage of the client device;

receive a selection of the option to receive the alternate version of the copy of the content item stored at the at least one storage of the client device;

request the alternate version of the copy of the content item stored at the at least one storage of the client device from the server;

receive the alternate version from the server, wherein the alternate version is a modified version of the content item; and open the alternate version of the copy of the content item according to the instruction.

2. The system of claim 1 wherein the user interface is a local file system browsing application.

3. The system of claim 1, wherein the instruction includes a location at the content management system server containing a further file event instruction.

4. The system of claim 1, wherein the instruction was created at the content management system server, and causes the client application to open the copy of the content item stored at the at least one storage of the client device in a limited access mode.

5. The system of claim 1, wherein the instruction was created at the content management system server, and causes the client application to open the copy of the content item after presenting collaboration data pertinent to the content item.

6. The system of claim 5, wherein the collaboration data is work flow data that includes tasks associated with the content item.

7. The system of claim 6, wherein the work flow data causes the client application to determine whether the content item is open by another user by communicating with the server, and when it is determined that the content item is open by another user, open the file as read-only or disallow saving of the content item.

8. The system of claim 1, wherein the instruction was created at the content management system server, and causes the client application to decrypt the copy of the content item stored at the at least one storage of the client device.

9. The system of claim 1, wherein the instruction specific to the content item is retrieved using metadata for the content item that refers to the storage location of the instruction associated with the content item.

10. The system of claim 1, wherein the instructions cause the client application to determine whether the content item is open by another user by communicating with the server, and when it is determined that the content item is open by another user, open the content item as read-only.

11. The system of claim 1, wherein the instructions cause the client application to receive acceptance of conditions prior to opening the content item.

12. A non-transitory computer readable storage comprising instructions stored thereon, the instructions effective to cause a computing device to:

detect a kernel level file open event for a content item in the computer readable storage of the client device that originates from an interface to a local file system of an operating system of the client device, wherein copies of the content item exist at a content management system server and in the computer readable storage of the client device;
interrupt the kernel level file open event for the content item in the computer readable storage of the client device; and
in response to the interrupting the kernel level file open event, retrieving from the computer readable storage of the client device an instruction for presenting the content item in cooperation with the content management system server;
contact the content management system server according to the instruction;
present by the client application an option to receive an alternate version of the copy of the content item stored at the at least one storage of the client device;
receive a selection of the option to receive the alternate version of the copy of the content item stored at the at least one storage of the client device;
request the alternate version of the copy of the content item stored at the at least one storage of the client device from the server;
receive the alternate version from the server, wherein the alternate version is a modified version of the content item; and
open the alternate version of the copy of the content item according to the instruction.

13. The non-transitory computer readable storage of claim 12 wherein the interface is a local file system browsing application.

14. A method comprising:
detecting a kernel level file open event for a content item in the storage of the client device that originates from an interface to a local file system of an operating system of the client device, wherein copies of the content item exist at a content management system server and in the computer readable storage of the client device;
interrupting the kernel level file open event for the content item in the storage of the client device; and
in response to the interrupting the kernel level file open event, retrieving from the storage of the client device an instruction for handling or presenting the content item in cooperation with the content management system server;
contacting the content management system server according to the instruction;
present by the client application an option to receive an alternate version of the copy of the content item stored at the at least one storage of the client device;
receive a selection of the option to receive the alternate version of the copy of the content item stored at the at least one storage of the client device;
request the alternate version of the copy of the content item stored at the at least one storage of the client device from the server;
receive the alternate version from the server, wherein the alternate version is a modified version of the content item and
opening the alternate version of the copy of the content item according to the instruction.

15. The method of claim 14 wherein the interface is a local file system browsing application.

* * * * *